W. A. HALL.
PROCESS OF PREVENTING ESCAPE OF NOXIOUS GASES IN SMELTING.
APPLICATION FILED JUNE 25, 1913.
1,133,637.
Patented Mar. 30, 1915.
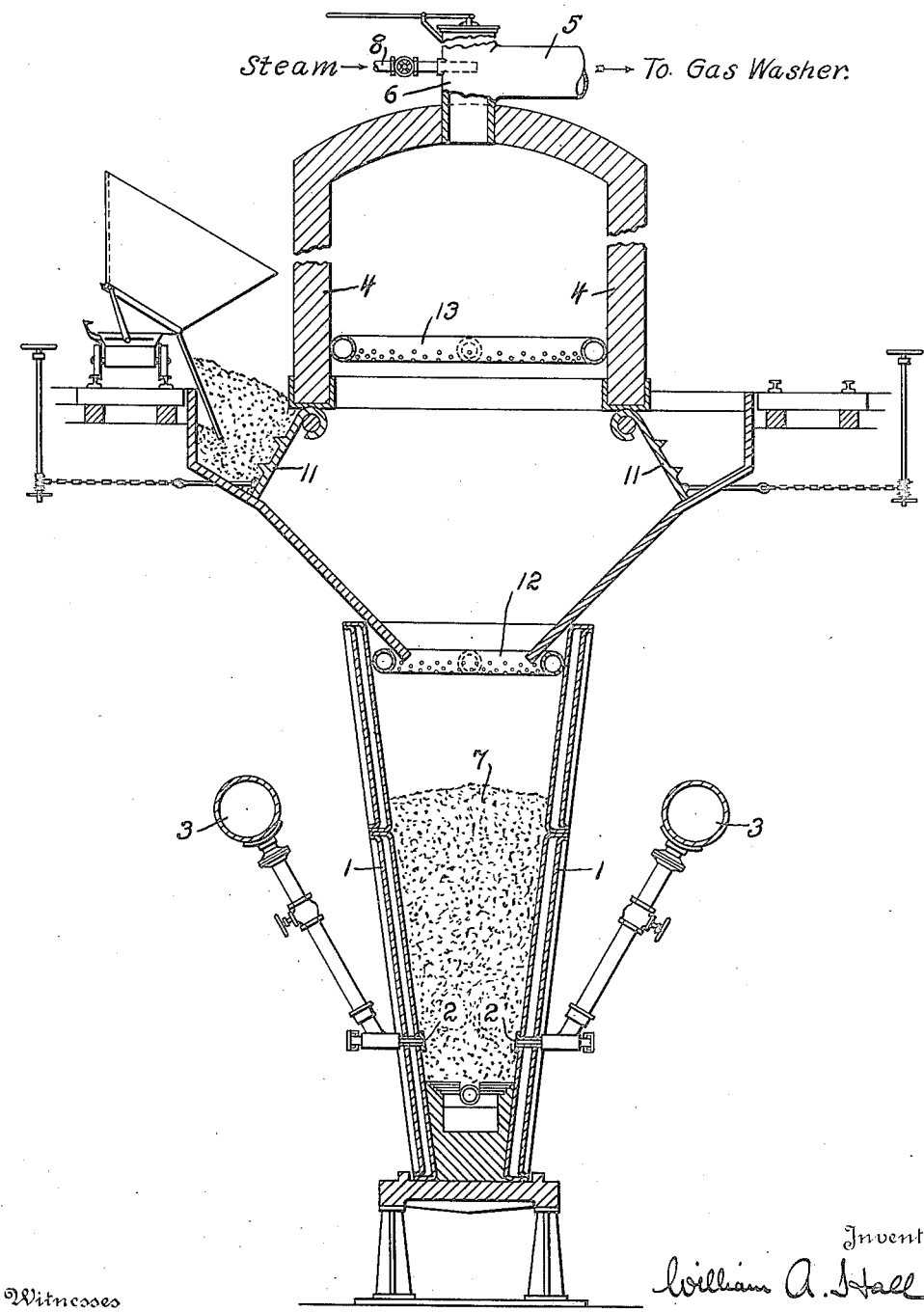

UNITED STATES PATENT OFFICE.

WILLIAM A. HALL, OF NEW YORK, N. Y.

PROCESS OF PREVENTING ESCAPE OF NOXIOUS GASES IN SMELTING.

1,133,637. Specification of Letters Patent. Patented Mar. 30, 1915.

Application filed June 25, 1913. Serial No. 775,740.

*To all whom it may concern:*

Be it known that I, WILLIAM A. HALL, a citizen of the United States, residing at New York, in the county of New York and State of New York, have invented or discovered certain new and useful Improvements in Processes of Preventing Escape of Noxious Gases in Smelting, of which the following is a specification.

My present invention relates to the prevention of the escape of noxious gases, particularly $SO_2$, in the operation of smelting sulfid ores, and has particular reference to the avoidance of such noxious gases in pyritic smelting, although the same may be used in semi-pyritic smelting, and in the ordinary smelting process, in which a considerable amount of fuel is employed together with the sulfid ore.

The objects of the invention are to convert the $SO_2$ produced in the focus of the blast furnace into a harmless material before the same reaches the outer air, and to prevent the burning or oxidation of all sulfur which may be produced as elemental sulfur formed. This object is attained preferably by the formation of a reducing agent within the furnace structure, at a point well above the focus, but at which point the temperature is still high enough to produce the reducing agent, and to cause the commencement of the reaction between the reducing agent and the $SO_2$ produced in the focus.

In carrying out this process I preferably maintain the top of the ore in as cold condition as is practicable, which may be accomplished by continuously introducing fresh ore to be smelted into the top of the furnace, and also by continuously spraying the top of the ore with water or an aqueous solution. In this manner I can easily maintain a temperature at the top of the charge so low, that the sulfur vapor will not ignite, even if there is a considerable amount of free oxygen present. A portion of the water percolates downwardly through the body of ore, thereby keeping the top layer of the ore very much cooler than the ore is kept in the ordinary smelting process. By the time the water reaches a point where the temperature of the gases in the smelter is well above the boiling point, the water is entirely converted into steam, which reacts with a certain amount of the sulfid ore, with evolution of $H_2S$.

The amount of water introduced into the top of the shaft should be carefully regulated so that none of the water or steam gets down into dangerous proximity to the focus, although it is necessary to have a certain amount of the water introduced reach a point in the furnace, at which a sufficiently high temperature exists for the formation of $H_2S$ by reaction of the water or steam upon the sulfid ore. This can be readily accomplished since I prefer to use a smelter in which the column of ore is quite deep.

It will be noted that while some of the water may percolate down as liquid water, between the separate pieces of ore, a material amount of the water is carried down, and apparently carried farther down into the furnace, than the portion which trickles over the ore, by being absorbed by the lumps of ore under treatment and by the lime and silica, and will then be vaporized when the ore itself reaches a high temperature.

The $H_2S$ produced by the action of the steam and sulfid ore, combines with the $SO_2$ present in the gases, (being produced by the oxidation of the sulfur at the focus of the smelter) in accordance with the following well known reaction.

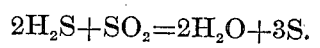
$$2H_2S + SO_2 = 2H_2O + 3S.$$

The sulfur thereby produced then passes upwardly in the form of vapor of sulfur and is carried out of the furnace by means of the strong current of fumes and gases. This reaction may not be completed within the blast furnace itself, but continues in the flue dust chambers, or in the gas washers, and will be substantially complete by the time the gases are discharged into the atmosphere. In this manner substantially all of the $SO_2$ produced in the smelter may be decomposed, and the gases and vapors, together with flue dust, leaving the smelter may be passed through a dust settling chamber, of the ordinary construction, and the sulfur in solid form recovered, thereby producing a by-product of considerable value.

The continuous introduction of ore into a blast furnace I consider to be a particularly valuable feature of the present invention, for the reason that by making the process continuous, I can very much more readily maintain a comparatively cold top, and also the process operates much more smoothly and with less fluctuation. This process should preferably be carried out in a blast furnace, provided with a closed top, in order that substantially no false air shall enter at this point, and a suitable mechanical device is employed for feeding in the ore in a substantially continuous manner, without admitting false air. In order to more readily prevent the introduction of false air at the top, I preferably operate the furnace under slight pressure, so that there is no tendency for false air to work its way into the smelter at any point.

I am aware that it has heretofore been proposed to smelt sulfid ores in such a manner that no noxious gases are allowed to escape, but in said processes it has heretofore generally been necessary to treat the gases leaving the blast furnace to absorb or decompose the $SO_2$ in said gases, before said gases are allowed to escape. In my process, on the contrary, the $SO_2$ is largely decomposed within the blast furnace itself, or provided with a reducing agent within the furnace itself. In other processes in which the $SO_2$ was reduced, in the furnace, it has heretofore always been supposed that the escape of $SO_2$ fumes could not be prevented without all of the following conditions being maintained: First, substantially all free oxygen contained in the air blown through the twyers to be consumed in the focus, (which means reduction of the air blown in). Second, only a reducing or neutral atmosphere to exist in the shaft or ore column above the focus so that no oxidation of sulfur would occur above the focus, thereby preventing the formation of any $SO_2$ above the focus. Third, all $SO_2$ generated in the focus to be reduced by the coke that is added to the charge, said coke driving all the oxygen with which it unites from the $SO_2$ arising from the focus, and being all consumed in the ore column before entering the focus. Fourth, no free air admission at the top of the charge to ignite the volatilized S, arising at that point. A combination of such conditions has never been obtained and as far as I can ascertain no blast furnace has ever been so operated. I have, however, discovered that the desired result can be obtained without reducing the amount of free oxygen blown through the twyers, any material reduction in which would be impracticable. Also, without the use of a hermetically sealed head and without any material reduction of $SO_2$ by coke. I can obtain the desired results even if no coke is used, or if coke is used there is so much free oxygen in the ore column as to supply all the oxgen requirements of the coke so that it would derive none of its oxygen from $SO_2$. I can do all this and maintain an atmosphere in the ore column of over 40% free air equivalent to about 8% free O.

I accomplish the result by constantly maintaining a wet and comparatively cold layer of fresh ore, silica and lime, (in the proportions ordinarily used in smelting) on top of the heated mass that is undergoing the smelting operation in the ore column. This comparatively cold, wet, layer prevents all combustion of sulfur and coke in the very upper zone of the ore column and lowers the temperature at that point to the extent where there can be no further oxidation by contact with false air, or outside atmosphere above the charge. Also, I find that I can generate a sufficient amount of $H_2S$ in this very upper level to react with substantially all the $SO_2$ arising from the focus.

The process constituting my invention, may be carried out in an apparatus such as is shown in the accompanying drawing, in which the figure represents a vertical section of a blast furnace modified so as to be suitable for carrying out the process.

In said drawing 1 represents a water jacketed blast furnace, provided with twyers 2, which are supplied with a blast by means of the pipes 3, in the usual manner. The blast furnace is provided with a hermetically closed top or casing 4, and is connected with a flue 5, leading to a suitable gas washer. In the pipe 6 connecting the casing 4 with the pipe 5, a suitable pipe 8 for the admission of steam may be provided if desired, although it ordinarily will not be necessary to supply additional steam at this point.

7 represents the normal charge level in the furnace, and the charge may consist of cupreous pyrites, silica and lime, to which a small amount of coal or coke (say 4 or 5% based on the weight of the pyrites, as is usual in pyritic smelting) may be added. The charge is supplied to the furnace in the usual manner, by means of the doors or gates 11, and the ore is supplied at such a rate as to maintain the level of the ore in the blast furnace, substantially uniform.

12 illustrates a pipe for admitting a spray of water onto the upper surface of the ore charge, in order to maintain the upper layer of the ore charge, at a temperature materially below the point of ignition of free sulfur. An additional pipe 13 likewise perforated, may be provided for admitting water spray, particularly during the time when the ore is being admitted by opening the gates 11. This pipe may also be used at all times for supplying water, if so desired.

I am aware of the patent to Stickney, 587,068, July 27, 1897, in which steam is blown, together with air and fuel gas or oil, into the bottom part of a blast furnace, in which pyrites or other sulfid ore is being roasted, but the process described in said patent is very different from the process of my present application, in that in my process I maintain the top of the ore in as cold a condition as possible, and avoid the introduction of steam or water in the focus, or in dangerous proximity thereto. Also I do not find it ordinarily necessary to introduce gas or oil fuel with the air, in the focus. Moreover I do not in any manner alter the normal working conditions in the focus. Such introduction of steam in the focus is highly detrimental, since it lowers the temperature in the focus and prevents ready and complete combustion of the sulfur and iron of the charge.

What I claim is:—

1. In a process of smelting sulfid ore, the step of preventing the discharge of sulfurous gases into the atmosphere, which comprises continuously maintaining the top of the ore charge, over substantially its entire area, at a temperature below that at which free sulfur will ignite, by spraying the top of the ore charge with a liquid containing water, while avoiding the introduction of any considerable quantities of air into contact with the top of the ore charge, thereby generating sufficient hydrogen sulfid in the upper part of the furnace to reduce substantially all of the sulfur dioxid in the gases coming up through the ore charge, and also preventing combustion of the free sulfur in said gases.

2. In a process of smelting sulfids, the step of preventing the discharge of sulfurous gases into the atmosphere, which comprises continuously maintaining a layer of said ore, at the top of the ore charge, at a temperature below that at which free sulfur will ignite, by spraying the top of the ore charge with a liquid containing water, while introducing ore in a substantially continuous manner, thereby producing hydrogen sulfid, for reducing the sulfur dioxid in the gases.

3. In a process of smelting metal sulfids, the step of preventing the discharge of material amounts of sulfur dioxid into the atmosphere which comprises cooling the gases, within the furnace charge in the furnace, to a temperature below the ignition point of free sulfur, while introducing the charge to the furnace in a substantially continuous manner.

4. In a process of smelting sulfids, the step of preventing the discharge of sulfurous gases into the atmosphere, which comprises maintaining a layer of said sulfids, at the top of the charge, at a temperature below that at which sulfur will ignite, by spraying the top of the ore charge with a liquid containing water.

5. In the process of smelting sulfid ore, the method of preventing the emission of sulfur dioxid, by maintaining a layer of the charge at a temperature below that at which free sulfur will ignite, and generating within the furnace at a point between the focus and said cold layer, hydrogen sulfid in amount capable of reducing at least the major portion of the sulfur dioxid in the furnace gases, to free sulfur.

6. The process of preventing escape of noxious gases in pyritic smelting, which comprises maintaining a layer of the charge at a temperature below that at which sulfur will ingite, and generating hydrogen sulfid in the gases in the furnace, before said gases reach said layer.

7. The process which comprises smelting metal sulfids and generating hydrogen sulfid during the smelting operation within the furnace charge, at a point remote from the focus, in amount sufficient to reduce substantially all sulfur dioxid present in the gases.

In testimony whereof I have affixed my signature, in presence of two witnesses.

WILLIAM A. HALL.

Witnesses:
A. W. PERKINS,
M. R. McKAY.